2,786,739
CONTINUOUS PROCESS FOR THE PRODUCTION OF METHACRYLIC ACID ESTERS AND AMMONIUM SULPHATE

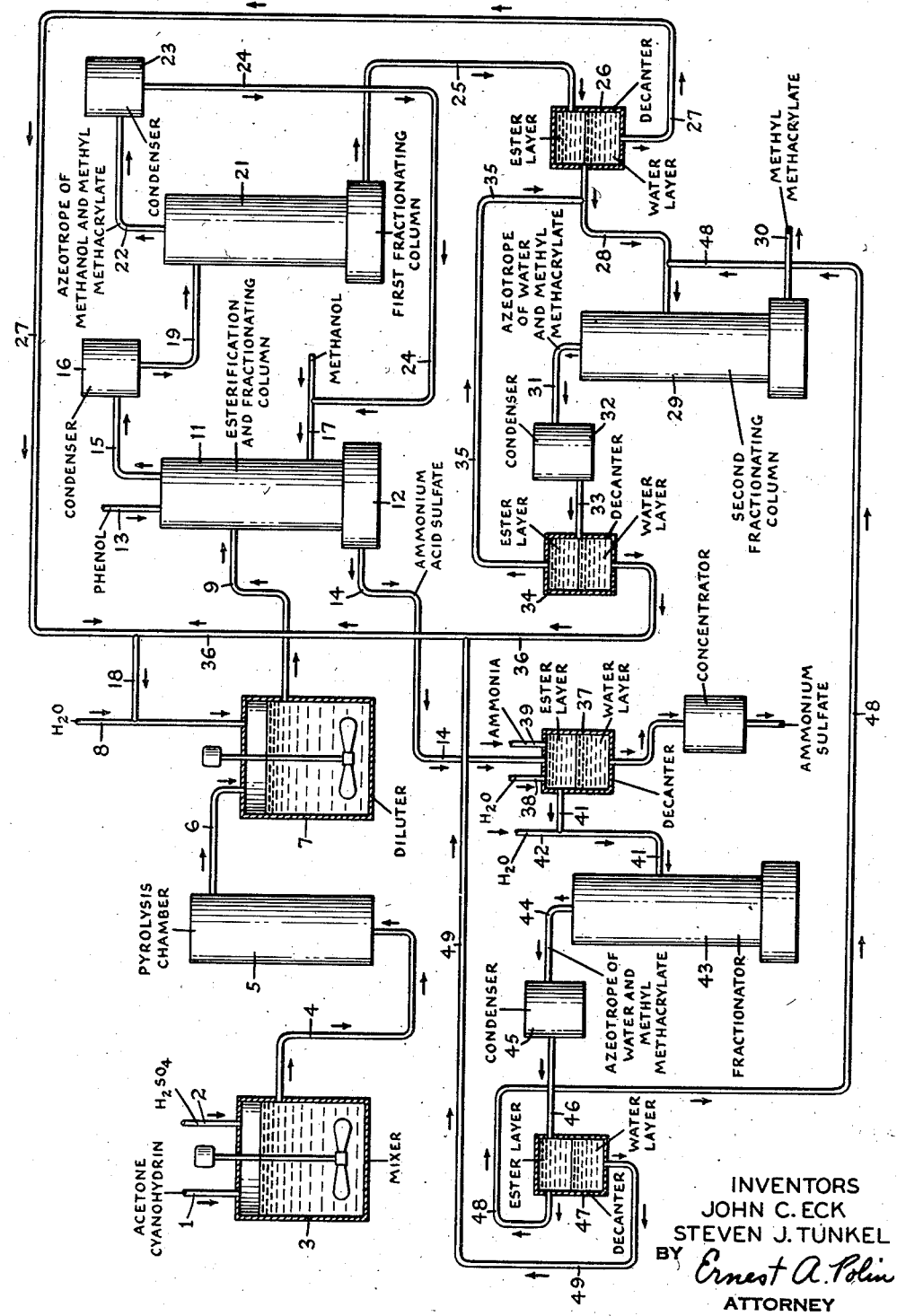

John C. Eck, Convent, and Steven J. Tunkel, Morristown, N. J., assignors to Allied Chemical & Dye Corporation, New York, N. Y., a corporation of New York Application May 10, 1954, Serial No. 428,768

7 Claims. (Cl. 23—119)

This invention relates to the preparation of methacrylic acid esters, useful as raw materials for the production of polymeric materials, and more particularly relates to the production of methacrylic acid esters and ammonium sulfate compound in continuous manner from acetone cyanohydrin.

It is well known to produce methacrylic acid esters and by-product ammonium acid sulfate by reacting acetone cyanohydrin with concentrated or fuming sulfuric acid, and then reacting the product with an alcohol in the presence or absence of water.

An object of the present invention is to provide a simple and economical continuous process for the production of methacrylic acid esters and ammonium sulfate compound in excellent yields. Another object of the present invention is to provide a simple and economical continuous process for the production of methyl methacrylate and ammonium sulfate compound in excellent yields by the reaction of acetone cyanohydrin, sulfuric acid, water and methanol. Other objects and advantages of the invention will be apparent from the following detailed description thereof.

The continuous process of the present invention is suitable for the production of methacrylic acid esters generally but may be illustrated by the production of methyl methacrylate. The process is carried out by reacting acetone cyanohydrin with concentrated or fuming sulfuric acid, subjecting the reaction mixture to pyrolysis, and then esterifying the pyrolyzed material with methanol in aqueous medium and fractionating the reaction products in an esterification and fractionating column under such conditions that the bulk of the ester produced appears in the distillate and at least 1% by weight of the bottoms constitutes ester product. The distillate containing methyl methacrylate is then fractionated to recover methyl methacrylate product.

By means of the above operation we have found, contrary to expectation, that the bottoms of the esterification and fractionating column are substantially free of water-soluble organic material and may be treated by simple decantation to separate the organic substances present, including methyl methacrylate, and recover by-product ammonia values, if desired, as valuable ammonium sulfate, in yields approximating 95% of theory. In addition, we have found (again, contrary to expectation) that in our operation the distillate and organic portion recovered from the bottoms containing methyl methacrylate are substantially free of sulfur dioxide which, if present, would act as catalyst for undesired polymerization reactions. Methyl methacrylate product, which may be recovered from separate or combined streams of distillate and organic bottoms, is obtained in high yield.

On the other hand, the bottoms obtained by prior art procedures contain water-soluble organic material in such concentrated and degraded form that it does not separate from the aqueous ammonium sulfate phase and must be pyrolyzed to convert the water-soluble organic material to water-insoluble form. Such treatment results in substantial loss of ammonium sulfate values. Further, during operation of prior art procedures there is reaction between the organic material and by-product ammonium acid sulfate which results in formation of sulfur dioxide.

Although the exact nature of the effect of methyl methacrylate on the bottoms of the esterification and fractionating column is not fully understood, it is believed that the presence of the methyl methacrylate in the minimum quantity recited acts in some way as an anticatalyst to prevent formation of water-soluble organic material as well as of sulfur dioxide.

Although amounts of methyl methacrylate greater than the minimum of 1% by weight, stated above, may be contained in the bottoms of the esterification and fractionating column, for the sake of efficiency of operation, the bottoms should not contain amounts of methyl methacrylate in excess of about 10% by weight.

According to a specific embodiment of our invention, acetone cyanohydrin is reacted with sulfuric acid; the reaction mixture is subjected to pyrolysis; the pyrolyzed material is diluted with water; and the diluted mixture is esterified with methanol and the esterification products fractionated in an esterification and fractionating column under such conditions that the distillate contains the bulk of the methyl methacrylate product and the bottoms of the column contain in addition to by-product ammonium acid sulfate at least 1% by weight, and preferably about 2 to 6% by weight methyl methacrylate product. During the esterification and fractionation procedure the temperature of the esterification and fractionating column is controlled so that the bottom of the column is maintained at about 118° to 120° C., the intermediate portion of the column is maintained at about 110° to 120° C. and the top portion of the column is maintained at about 100° to 110° C. The distillate containing methyl methacrylate is then fractionated to recover substantially pure methyl methacrylate.

The esterification bottoms are diluted with water and ammoniated to a pH of about 5.8 to 6.5, preferably about 6.0, thereby converting the ammonium acid sulfate to ammonium sulfate. The mixture separates into two layers, an upper layer containing methyl methacrylate and a lower layer containing ammonium sulfate. The upper layer is distilled with water to form an azeotrope of water and methyl methacrylate. The azeotrope is condensed thereby forming two layers, an upper layer consisting predominantly of methyl methacrylate and a lower layer containing a predominant amount of water. The upper layer is fractionated, preferably together with the distillate containing the bulk of the methyl methacrylate, to recover substantially pure product, and the water layer is recycled to the dilution step of the process. The lower layer resulting from the ammoniation is concentrated to dryness to produce substantially pure ammonium sulfate.

The reactions involved in the process are believed to be as follows: In the mixing step, sulfuric acid reacts with acetone cyanohydrin to produce the sulfate ester of α-hydroxyisobutyramide. In the pyrolysis step, there is produced a sulfuric acid solution of methacrylamide which may exist partially as a sulfate. In the dilution step, the sulfuric acid is diluted with water and part of the methacrylamide may be hydrolyzed to methacrylic acid. In the esterification step, the methacrylamide and the methacrylic acid formed in the dilution step are esterified either directly from the amide or indirectly through the acid to methyl methacrylate. The nitrogen from the amide is converted to by-product ammonium acid sulfate which upon ammoniation forms ammonium sulfate.

As esters of methacrylic acid which may be recovered in excellent yield together with ammonium sulfate according to the present invention may be mentioned the methyl, propyl, butyl, allyl and ethylene glycol esters.

The attached drawing is a flow sheet illustrating one way of carrying out the process of the invention.

Acetone cyanohydrin and 100% sulfuric acid containing copper powder in an amount equivalent to 0.1% by weight of the acid as polymerization inhibitor, in mol ratio of 1 mol of cyanohydrin to about 1.7 to 1.8 mols of $H_2SO_4$, are introduced through lines 1 and 2, respectively, into a mixer 3 provided with an agitator. In mixer 3 the cyanohydrin and $H_2SO_4$ are reacted with stirring at a temperature of about 88° to 95° C. for about 1.1 to 1.9 hours. Smaller amounts of $H_2SO_4$ than given above should not be used, since the viscosity of the reaction mixture would then be excessive. The reaction mixture overflows from mixer 3 through line 4 to the bottom of a pyrolysis chamber 5 where heating at about 138° to 140° C. for about 3.8 to about 6.8 minutes takes place. The resultant mixture overflows chamber 5 through line 6 and passes to a diluter 7 provided with an agitator. Water is introduced through line 8 into diluter 7, in mol ratio of about 2.0 to 2.3 mols of water per mol of cyanohydrin, and the diluted mixture is held with stirring at a temperature of about 80° to 95° C. for about 14 to 16 minutes. This dilution step is necessary since if the continuous esterification is carried out with separate inlet streams of the sulfuric acid solution, water and methanol to the esterification column, a "hot spot" occurs at the point of inlet of the sulfuric acid solution which results in charring, plugging and loss of yield. From diluter 7 the mixture flows via line 9 to an intermediate point of an esterification and fractionating column 11 provided with a pot 12. It will be understood by those skilled in the art that column 11 may be any suitably packed tower for effecting the esterification and fractionating procedure. Excellent results have been obtained using a tower containing 45 plates and divided into 3 sections of Berl saddles packing, each section about 6 ft. high. The number of plates in the column can be varied dependent largely upon the input of reactants and the rate of flow of the reactants through the column. A 20% by weight solution of phenol in methanol as polymerization inhibitor is introduced through line 13 at the top of column 11. Methanol, in mol ratio of about 2.8 to 3.0 mols of methanol per mol of cyanohydrin, is introduced through line 17 near the bottom of column 11. The esterification reaction is carried out for about 30 seconds to 3 minutes using pressure between atmospheric and 1.5 p. s. i. gauge, a pot temperature of about 130° to 140° C. and column temperatures of about 118° to 120° C. at the bottom of the column, about 110° to 120° C. at the intermediate portion of the column and about 100° to 110° C. at the top of the column. During the esterification reaction a slow purge of air or oxygen is preferably introduced into the pot to aid in preventing polymerization and in elevating the vapors present.

Vapors of methyl methacrylate, methanol and water substantially free of sulfur dioxide, i. e. containing less than 30 p. p. m. of sulfur dioxide, evolve from the top of column 11 and pass via line 15 to a condenser 16. The condensed material than flows through line 19 to a first fractionating column 21 which may be any conventional fractionating column and may be provided with filler bodies, bell plates, sieve plates or the like. The material is distilled at atmospheric pressure in column 21. From the top of fractionating column 21 is removed through line 22 an overhead having a vapor temperature of 64° to 70° C. and consisting of an azeotrope of methanol and methyl methacrylate having a composition of 82% by weight methanol and 18% by weight methyl methacrylate. The azeotrope is condensed in condenser 23 and recycled via lines 24 and 17 to esterification and fractionating column 11 as make-up methanol. The bottoms from column 21 are passed through line 25 to a decanter 26 where they separate into two layers, an upper ester layer and a lower water layer. The water layer is recycled via lines 27, 18 and 8 to diluter 7 as make-up water. The ester layer is passed via line 28 to a second conventional fractionating column 29 which may be provided with filler bodies, bell plates, sieve plates, or the like. In fractionating column 29 the ester layer is distilled at reduced pressure, e. g. 450 mm. Hg pressure. The overhead of fractionating column 29 with a vapor temperature of about 61° C. consisting of an azeotrope of water and methyl methacrylate having a composition of 11.6% by weight water and 88.4% by weight methyl methacrylate. The overhead material passes through line 31 to a condenser 32, and the condensed material passes via line 33 to a decanter 34 where it forms two layers, an upper ester layer and a lower water layer. The ester layer is recycled to second fractionating column 29 through lines 35 and 28 and is again distilled. The water is recycled through lines 36, 18 and 8 to diluter 7 as make-up water. The bottoms of fractionating column 29 consisting of methyl methacrylate of greater than 98.5% purity are withdrawn from the system through line 30.

Since polymerization reactions are formed at high temperatures, it is preferred to carry out the second distillation step at reduced pressure so that a lower temperature for distillation may be achieved. However, atmospheric pressure and proportionately higher temperatures may be used if careful control of the distillation is practiced.

The bottoms of column 11 contain by-product ammonium acid sulfate and at least 1% by weight methyl methacrylate, preferably about 2 to 6% by weight methyl methacrylate. The bottoms are passed as overflow from pot 12 via line 14 to a decanter 37 into which water and ammonia are introduced through lines 38 and 39, respectively. Sufficient ammonia is added to produce a pH of about 6.0, thereby converting the ammonium acid sulfate into ammonium sulfate. The diluted mixture separates into two layers, an upper ester layer containing methyl methacrylate and a lower aqueous layer containing ammonium sulfate. The upper layer is withdrawn through line 41. Water is introduced through line 42 into line 41, and the diluted material is passed to a fractionator 43 wherein the material is distilled to produce water bottoms and, as distillate, an azeotrope of water and methyl methacrylate having a vapor temperature of about 80° to 85° C. and a composition of 12% by weight water and 88% by weight methyl methacrylate. The azeotrope is withdrawn through line 44 and passed to a condenser 45, and then via line 46 to a decanter 47. In decanter 47 the mixture separates into two layers. The upper layer containing methyl methacrylate is recycled via lines 48 and 28 to second fractionating column 29 where it is distilled together with methyl methacrylate-containing material recovered from the distillate of esterification and fractionating column 11. Thus, in this embodiment of the invention, methyl methacrylate present both in the distillate and in controlled quantity in the bottoms of column 11 is withdrawn from the system by the single discharge line 30. The yield of ester is high, being ordinarily above 80% of theory, as up to 85% or more, based on the acetone cyanohydrin reacted. The lower layer containing mostly water is recycled via lines 49, 36, 18 and 8 to diluter 7. The lower layer from decanter 37 is withdrawn through line 51 to a concentrator 52 wherein the ammonium sulfate is evaporated to dryness at a temperature of about 80° to 100° C. and removed as substantially pure ammonium sulfate through line 53. The amount of ammonium sulfate recovered represents a yield of at least about 95% of theory, based on the acetone cyanohydrin reacted.

Alternatively, the separate distillation step in fractionator 43 may be omitted, in which case the ester layer withdrawn from decanter 37 may be passed directly to fractionating column 21 or fractionating column 29.

During all of the distillation steps described above a polymerization inhibitor such as phenol is preferably added and the distillation equipment is preferably purged with a slow stream of air or oxygen.

Inhibitors other than copper powder and phenol may be employed for suppressing the polymerization reactions during the process. Examples of these are anhydrous copper sulfate and hydroquinone.

Suitable constructional materials for the columns and other associate parts are, for example, iron, aluminum and materials lined with zinc, tin or lead. In many cases copper and materials lined with copper are particularly advantageous because small amounts of dissolved copper act as polymerization inhibitor.

Although not shown in the drawing, the usual conventional auxiliary equipment common in industry, such as temperature controls for regulating the temperature at the top of the columns, surge tanks and pumps, are employed for facilitating the operation of the process.

The following example illustrates one method of carrying out the present invention.

*Example*

42.6 cc. per minute of acetone cyanohydrin and 50.0 cc. per minute of 100% sulphuric acid containing 0.1% by weight of copper powder are introduced into mixer 3 where they are reacted with stirring at a temperature of about 87° to 91° C. for about 114 minutes. The reaction mixture is then heated in pyrolysis chamber 5 at about 140° C. for about 6.8 minutes. The resultant mixture is diluted with 16.2 cc. per minute of water in diluter 7 and subjected to a temperature of about 90° to 95° C. for about 14 minutes. The diluted mixture is then passed to esterification and fractionating column 11 containing 45 plates and enters in the intermediate portion of the column. 16 cc. per minute of a 20 percent solution of phenol in methanol is introduced at the top of column 11. 55.2 cc. of methanol per minute is introduced near the bottom of column 11, and the esterification reaction is carried out for about 3 minutes using a pot temperature of about 135° C., and top, middle and bottom column temperature of about 100°, 118° and 120° C., respectively.

The bottoms of the esterification reaction contain by-product ammonium acid sulfate and about 2.25% by weight methyl methacrylate. To the bottoms are added 74 cc. of water per minute, and the resulting solution is treated with ammonia to obtain a pH of 6.0. The resulting mixture separates into two layers. The upper ester layer is fractionated to recover 0.13 part by weight/min. of substantially pure methyl methacrylate constituting a 4 percent yield, based on the acetone cyanohydrin reacted. The lower layer resulting from the ammoniation is concentrated to dryness to yield 0.97 part by weight/min. of substantially pure ammonium sulfate, constituting a 95 percent yield of ammonium sulfate, based on the acetone cyanohydrin reacted.

Vapors of methyl methacrylate, methanol and water substantially free of sulfur dioxide pass out the top of the esterification and fractionating column and are passed to condenser 16. The condensed material is then passed to fractionating column 21 where it is distilled at atmospheric pressure to remove as overhead having a vapor temperature of 64° to 70° C. an azeotrope of methanol and methyl methacrylate. This azeotrope is recycled to esterification and fractionating column 11. The bottoms from fractionator 21 pass to decanter 26 where they separate into two layers. The lower aqueous layer is recycled to diluter 7. The upper ester layer is passed to fractionating column 29 where it is heated to distill over an azeotrope of water and methyl methacrylate having a vapor temperature of about 82° C. The distillate is passed to decanter 34 where it forms two layers. The upper ester layer is returned to fractionating column 29 for redistillation, and the lower water layer is recycled to diluter 7. The bottoms from fractionator 29 consti- tute methyl methacrylate having a purity of 98.5%. The amount of methyl methacrylate recovered represents a yield of 78%, based on the acetone cyanohydrin reacted. The combined yield of methyl methacrylate is therefore 82%, based on the acetone cyanohydrin reacted, which yield compares favorably with yields obtained by known processes.

In another run carried out in manner so as to distill substantially all of the methyl methacrylate from the esterification and fractionating column, the resultant bottoms contain water-soluble organic material. To recover the by-product ammonium acid sulfate as ammonium sulfate the bottoms are pyrolyzed, leached with water, the resultant solution ammoniated to a pH of 6 and then evaporated to dryness. The yield of ammonium sulfate is only about 83%, or about 12% lower than the yield of ammonium sulfate obtained by use of the present invention. Further, the overhead vapors from the esterification and fractionating column contain sulfur dioxide which must be removed prior to further fractionation in order to minimize polymerization reactions.

Although certain embodiments of the invention have been described for purposes of illustration, it will be evident that various changes and modifications may be made therein without departing from the scope and spirit of the invention.

We claim:

1. A continuous process for the production of a methacrylic acid ester which comprises reacting acetone cyanohydrin with sulfuric acid, subjecting the reaction mixture to pyrolysis, and then esterifying the pyrolyzed material with an alcohol in aqueous medium and fractionating the reaction products in an esterification and fractionating column under such conditions that the distillate contains the bulk of methacrylic acid ester and at least 1% by weight of the bottoms of the column, which contain by-product ammonium sulfate compound, constitutes methacrylic acid ester, separating said bottoms into an aqueous layer containing said ammonium sulfate compound and an organic layer containing methacrylic acid ester, and recovering ammonium sulfate compound from said aqueous layer and methacrylic acid ester from said distillate and said organic layer.

2. A continuous process for producing methyl methacrylate by esterification with methanol of an aqueous reaction mixture containing methacrylamide and sulfuric acid comprising effecting the esterification under continuous fractionation to produce distillate containing the bulk of methyl methacrylate product and bottoms containing by-product ammonium sulfate compound, controlling that fractionation so that said bottoms contain at least 1% by weight methyl methacrylate, separating said bottoms into an aqueous layer containing said ammonium sulfate compound and an organic layer containing methyl methacrylate, and recovering ammonium sulfate compound from said aqueous layer and methyl methacrylate from said distillate and said organic layer.

3. A continuous process for producing methyl methacrylate by esterification with methanol of an aqueous reaction mixture containing methacrylamide and sulfuric acid comprising effecting the esterification under continuous fractionation to produce distillate containing the bulk of methyl methacrylate product and bottoms containing by-product ammonium sulfate compound, controlling that fractionation so that said bottoms contain at least 1% by weight methyl methacrylate, separating said bottoms into an aqueous layer containing said ammonium sulfate compound and an organic layer containing methyl methacrylate, and recovering ammonium sulfate compound from said aqueous layer and fractionating said distillate together with said organic layer to recover methyl methacrylate.

4. A continuous process for the production of a methacrylic acid ester which comprises reacting acetone cyanohydrin with sulfuric acid, subjecting the reaction mixture to pyrolysis, diluting the pyrolyzed material with water, esterifying the diluted mixture with an alcohol and fractionating the reaction products in an esterification and fractionating column under such conditions that the distillate contains the bulk of methacrylic acid ester and at least 1% by weight of the bottoms of the column, which contain by-product ammonium acid sulfate, constitutes methacrylic acid ester, diluting the bottoms of the esterification and fractionating column with water and ammoniating said bottoms to convert the ammonium acid sulfate contained therein to ammonium sulfate and to effect formation of two layers, as upper ester layer containing methacrylic acid ester and a lower aqueous layer containing ammonium sulfate, concentrating said lower aqueous layer to recover substantially pure ammonium sulfate, and fractionating said distillate and said upper ester layer to recover substantially pure methacrylic acid ester.

5. A continuous process for the production of methyl methacrylate which comprises reacting acetone cyanohydrin with sulfuric acid, subjecting the reaction mixture to pyrolysis, diluting the pyrolyzed material with water, esterifying the diluted mixture with methanol and fractionating the reaction products in an esterification and fractionating column under such conditions that the distillate contains the bulk of methyl methacrylate and at least 1% by weight of the bottoms of the column, which contain by-product ammonium acid sulfate, constitutes methyl methacrylate, diluting the bottoms of the esterification and fractionating column with water and ammoniating said bottoms to convert the ammonium acid sulfate contained therein to ammonium sulfate and to effect formation of two layers, an upper ester layer containing methyl methacrylate and a lower aqueous layer containing ammonium sulfate, concentrating said lower aqueous layer to recover substantially pure ammonium sulfate and fractionating said distillate together with said upper ester layer to recover substantially pure methyl methacrylate.

6. A continuous process for the production of methyl methacrylate which comprises reacting acetone cyanohydrin with sulfuric acid, subjecting the reaction mixture to pyrolysis, diluting the pyrolyzed material with water, esterifying the diluted mixture with methanol and fractionating the reaction products in an esterification and fractionating column under such conditions that the distillate contains the bulk of methyl methacrylate and about 2 to 6% by weight of the bottoms of the column, which contain by-product ammonium acid sulfate, constitutes methyl methacrylate, temperature of the column being so controlled that the bottom of the column is maintained at about 118° to 120° C., the intermediate portion of the column is maintained at about 110° to 120° C. and the top portion of the column is maintained at about 100° to 110° C., fractionating said distillate to recover substantially pure methyl methacrylate, diluting the bottoms of the esterification and fractionating column with water and ammoniating said bottoms to convert the ammonium acid sulfate contained therein to ammonium sulfate and to effect formation of two layers, an upper ester layer containing methyl methacrylate and a lower aqueous layer containing ammonium sulfate, fractionating the upper layer to recover substantially pure methyl methacrylate and concentrating the lower layer to recover substantially pure ammonium sulfate.

7. A continuous process for production of methyl methacrylate which comprises reacting acetone cyanohydrin with sulfuric acid, subjecting the reaction mixture to pyrolysis, diluting the pyrolyzed material with water, esterifying the diluted mixture with methanol and fractionating the reaction products in an esterification and fractionating column under such conditions that the distillate contains the bulk of methyl methacrylate and about 2 to 6% by weight of the bottoms of the column, which contain by-product ammonium acid sulfate, constitutes methyl methacrylate, diluting the bottoms of the esterification and fractionating column with water and ammoniating said bottoms to convert the ammonium acid sulfate contained therein to ammonium sulfate and to form two layers, an upper ester layer containing methyl methacrylate and a lower aqueous layer containing ammonium sulfate, distilling the upper layer with water, thereby removing as distillate an azeotrope of water and methyl methacrylate, condensing said azeotrope to form two layers, an upper ester layer containing a predominant amount of methyl methacrylate and a lower aqueous layer, recycling the lower layer to the dilution step of the process, combining the upper layer with the distillate containing the bulk of methyl methacrylate, fractionating the combined material to recover substantially pure methyl methacrylate, and concentrating the lower aqueous layer containing ammonium sulfate to recover substantially pure ammonium sulfate.

References Cited in the file of this patent

UNITED STATES PATENTS

| Number | Name | Date |
| --- | --- | --- |
| 1,833,717 | Laird | Nov. 24, 1931 |
| 2,101,821 | Crawford | Dec. 7, 1937 |
| 2,311,134 | Schutt | Feb. 16, 1943 |
| 2,331,235 | Ruys | Oct. 5, 1943 |
| 2,373,464 | Dittmar | Apr. 10, 1945 |
| 2,416,756 | Jilk | Mar. 4, 1947 |

FOREIGN PATENTS

| Number | Country | Date |
| --- | --- | --- |
| 653,325 | Great Britain | May 16, 1951 |

OTHER REFERENCES

Rehrbert and Fischer: "Preparation and properties of N-alkyl acrylates," Journal of Amer. Chem. Soc., vol. 66, pages 1203, 1204, 1206, 1944.